United States Patent
Konzelmann et al.

(10) Patent No.: US 7,401,509 B2
(45) Date of Patent: *Jul. 22, 2008

(54) DEVICE FOR DETERMINING AIR MASS IN A LINE AND INCLUDING A SEPARATION OUTLET HAVING A WIND SHIELD STRUCTURE

(75) Inventors: Uwe Konzelmann, Asperg (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

This patent is subject to a terminal disclaimer.

(21) Appl. No.: 10/552,865

(22) PCT Filed: Feb. 11, 2004

(86) PCT No.: PCT/DE2004/000244

§ 371 (c)(1),
(2), (4) Date: Aug. 31, 2006

(87) PCT Pub. No.: WO2004/092689

PCT Pub. Date: Oct. 28, 2004

(65) Prior Publication Data

US 2007/0163338 A1    Jul. 19, 2007

(30) Foreign Application Priority Data

Apr. 10, 2003   (DE) .............................. 103 16 450

(51) Int. Cl.
*G01F 1/68* (2006.01)

(52) U.S. Cl. .................. 73/202.5; 73/204.21

(58) Field of Classification Search ............... 73/202.5, 73/204.21, 118.1
See application file for complete search history.

(56) References Cited

U.S. PATENT DOCUMENTS 5,467,648 A * 11/1995 Igarashi et al. ............. 73/202.5
5,563,340 A * 10/1996 Clowater et al. ........... 73/202.5
5,631,415 A * 5/1997 Igarashi et al. ............. 73/202.5

(Continued)

FOREIGN PATENT DOCUMENTS

DE         199 13 654         10/1999

(Continued)

*Primary Examiner*—Harshad Patel
(74) *Attorney, Agent, or Firm*—Kenyon & Kenyon LLP

(57) ABSTRACT

In a device for determining at least one parameter of a medium flowing in a main direction of flow in a line, which device has a part that can be inserted into the line with a predeterminable orientation in relation to the main direction of flow in such a manner that a partial stream of the medium flowing in the line passes into an entry region of a channel structure formed in the part, a measuring channel, provided with a measuring element for determining the at least one parameter, branching off from the entry region and the entry region having a separation zone which is separated from the measuring channel and has at least one separation aperture, which separation aperture opens into the line at a side wall of the part, which side wall extends substantially parallel to the main direction of flow, the part advantageously has at least one wind shield which is disposed downstream of the at least one separation aperture in the direction of the main direction of flow and which projects from the side wall provided with the separation aperture.

10 Claims, 4 Drawing Sheets

U.S. PATENT DOCUMENTS

| | | | | |
|---|---|---|---|---|
| 5,696,321 | A | * | 12/1997 | Igarashi et al. ............. 73/202.5 |
| 6,220,090 | B1 | * | 4/2001 | Kohno et al. .................. 73/202 |
| 6,234,015 | B1 | * | 5/2001 | Hamada et al. ............ 73/202.5 |
| 6,345,531 | B1 | * | 2/2002 | Mueller et al. ........... 73/204.22 |
| 6,915,682 | B2 | * | 7/2005 | Renninger et al. ............ 73/202 |
| 7,162,920 | B2 | * | 1/2007 | Konzelmann et al. ...... 73/202.5 |

FOREIGN PATENT DOCUMENTS

| | | |
|---|---|---|
| DE | 199 57 437 | 7/2000 |
| DE | 101 35 142 | 10/2002 |
| EP | 0 588 626 | 3/1994 |
| EP | 0 735 349 | 10/1996 |
| EP | 0 940 657 | 9/1999 |

* cited by examiner

DEVICE FOR DETERMINING AIR MASS IN A LINE AND INCLUDING A SEPARATION OUTLET HAVING A WIND SHIELD STRUCTURE

FIELD OF THE INVENTION

The invention relates to a device for determining at least one parameter of a medium flowing in a line

BACKGROUND INFORMATION

A device of that kind is known, for example, from German Patent No. 101 35 142 and is used, for example, in the intake system of an internal combustion engine in order to determine the air mass flow delivered to the internal combustion engine through a line. The known device has a channel structure with an inlet region from which a measuring channel, provided with the measuring element, branches off. The inlet region has a separation zone with at least one separation aperture situated at a side wall of the part of the device inserted into the line. The separation zone serves to remove liquid particles and/or solid particles from the channel structure, thus preventing them from entering the measuring channel which is provided with the measuring element, and contaminating the measuring element.

The edges formed by the front side facing toward the main direction of flow and the side walls of the part of the device inserted into the line are to be regarded as leading edges where, when the device is used in the medium-carrying line, large areas of detached flow develop which may give rise, on the one hand, to great pressure losses and, on the other hand, to unintended pulsation of the flow, as a result of which pressure variations are transmitted from the separation aperture through the separation zone to the inlet region and, from there, also to the measuring channel which branches off from the inlet region. The pressure variations in the measuring channel may cause considerable falsification of the output signal of the measuring element.

SUMMARY OF THE INVENTION

In contrast, the device according to the present invention for determining at least one parameter of a medium flowing in a line has the advantage that effects of the pulsating flow are kept away from the measuring element by a relatively simple and inexpensive measure, while the constructional configuration of the known device and hence its robustness and insensitivity to dust and water are largely retained. It is thereby advantageously possible for the quality and reproducibility of the measurement signal to be considerably improved. Owing to at least one wind shield, which is disposed downstream of the at least one separation aperture in the direction of the main direction of flow and which projects from the side wall provided with the separation aperture, the flow along the side wall is accelerated and the flow converges with the side wall to a greater extent in the vicinity of the separation aperture, which has the result of reducing pressure variations which might otherwise be transmitted to the measuring element through the separation aperture.

It is especially advantageous for the wind shield to have, in a direction perpendicular to the main direction of flow and parallel to the side wall of the part, a lengthwise dimension that corresponds to a multiple of the diameter of the separation aperture and that optimally extends in that direction over approximately the entire length of the part provided with the channel structure.

Wind shields that have proved to be advantageous are those in which the wind shield has a flat surface facing toward the main direction of flow, which surface forms with the side wall provided with the separation aperture an angle that is greater than or equal to 90° and smaller than 160°. The distance between the end of the wind shield projecting from the side wall and the side wall provided with the separation aperture is advantageously approximately from 0.5 to 5 millimeters.

In an especially advantageous exemplary embodiment, provision is made for the wind shield to have openings which are made in the wind shield in the form of notches. Advantageously, the wind shield is formed by a comb-like structure of teeth arranged side by side in a row. When the device is used in a medium-carrying line, strong longitudinal eddies develop starting at the notches. The longitudinal eddies bring about an exchange of momentum between the slow flow of medium in the dead water region and the rapid flow of medium outside the dead water region, thereby advantageously reducing the size of the dead water region and stabilizing the flow in that area.

DETAILED DESCRIPTION

Figure 1:
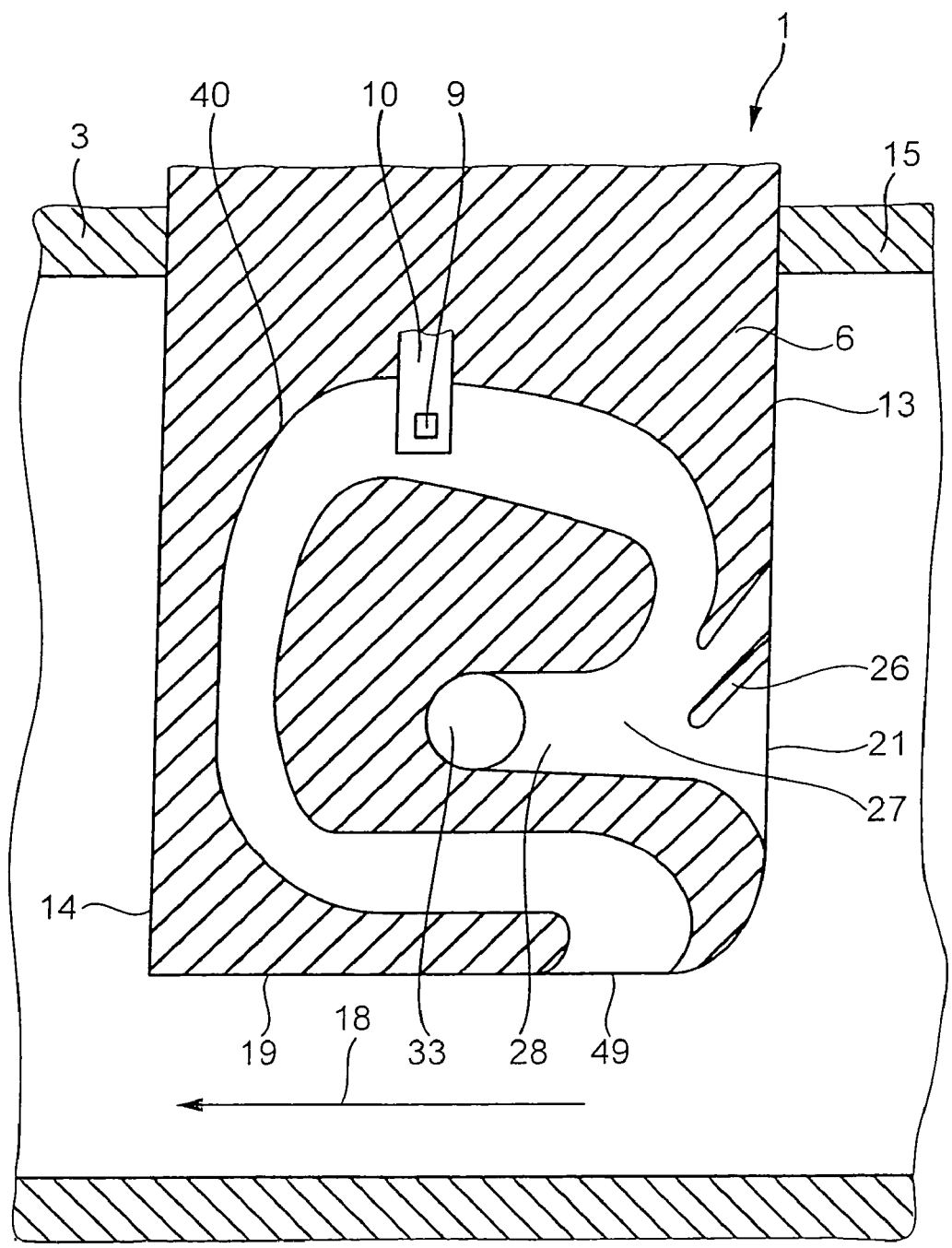
FIG. 1 shows a first exemplary embodiment of the device according to the invention in the installed position on a line.

FIG. 1 shows a line 3 in which a medium flows in a main direction of flow. The main direction of flow is marked by a corresponding arrow 18 in FIG. 1 and runs from right to left therein. The main direction of flow is defined as being the direction in which the medium in the line flows through the line from the inlet of the line to the outlet of the line mainly in that direction, even though local eddy formations and local detached flow regions exhibit a local deviation in flow from the main direction of flow. The line may, for example, be an intake manifold of an internal combustion engine. The medium in question is, for example, air flowing in the intake manifold.

A device 1 according to the present invention is arranged in line 3 in such a manner that a part 6 of the device projects like a finger into line 3 and is exposed, with a predetermined orientation, to the medium flowing therein. When part 6 is being installed in line 3, it is ensured that part 6 has a predetermined orientation in relation to main direction of flow 18 of the medium. Device 1 for determining at least one parameter of the medium includes, in addition to part 6 which is configured as a measuring housing, a supporting part, not shown in detail, having an electrical connection, in which supporting part an electronic evaluation unit, for example, may be accommodated. Device 1 may be inserted by part 6, for example, through an insertion opening in a wall 15 of line 3, which wall 15 delimits a flow cross-section of line 3. The electronic evaluation unit may be disposed within and/or outside of the flow cross-section of line 3.

For example, in device 1 a measuring element 9 on a measuring element support 10 is used, the measurement data of which may be evaluated by the electronic control unit. Using measuring element 9, there is determined as a parameter, for example, the volume flow or the mass flow of the flowing medium, especially the air mass flow. Further parameters that may be measured are, for example, pressure, temperature, concentration of a constituent of the medium, or flow speed, which are determined by suitable sensor elements.

Part 6 has a housing having, for example, a cuboid structure with a front wall 13 which, in the installed position, faces toward main direction of flow 18 of the medium, and a rear wall 14 which faces away from that direction, a first side wall 17 and, parallel thereto, a second side wall 18 (FIG. 2), and a third wall 19 which extends, for example, parallel to the main direction of flow and is situated at the end that is inserted into the line. Part 6 furthermore has a channel structure arranged therein, with an inlet region 27 and a measuring channel 40 which branches off from inlet region 27. The arrangement of device 1 relative to line 3 ensures that the medium flowing in main direction of flow 18 impinges on part 6 in a predetermined direction and a partial stream of the medium passes in that direction through an aperture 21 at front side 13 into inlet region 27 of the channel structure. Aperture 21 may, for example, be oriented perpendicular to main direction of flow 18, but a different orientation of aperture 21 with respect to main direction of flow 18 is also possible. A deflecting wall 26 is disposed in aperture 21. From inlet region 27, some of the medium enters measuring channel 40 provided with measuring element 9 and some of it flows on into a separation zone 28 which lies downstream of the branching point for the measuring channel and which opens into line 3 via at least one separation aperture 33 disposed in first side wall 17 and/or in second side wall 18 and/or in wall 19. In the exemplary embodiment shown in FIG. 1, main direction of flow 18 runs in a plane in which separation aperture 33 is also situated. A first partial stream of medium that has entered inlet region 27 flows completely into measuring channel 40 and leaves it through outlet 49 at wall 19 of part 6, whereas a second partial stream flows completely back into line 3 through the one separation aperture 33. In the flowing medium, liquid particles and/or solid particles, such as oil or water particles, are present, for example, which are able to contaminate or damage measuring element 9. Owing to separation aperture 33 and the geometrical configuration of the channel structure in the entry region, liquid particles and solid particles do not pass into the measuring channel but flow back into line 3 again. The exact mode of operation of the separation zone is described, for example, in German Patent No. 101 35 142.

Figure 2:
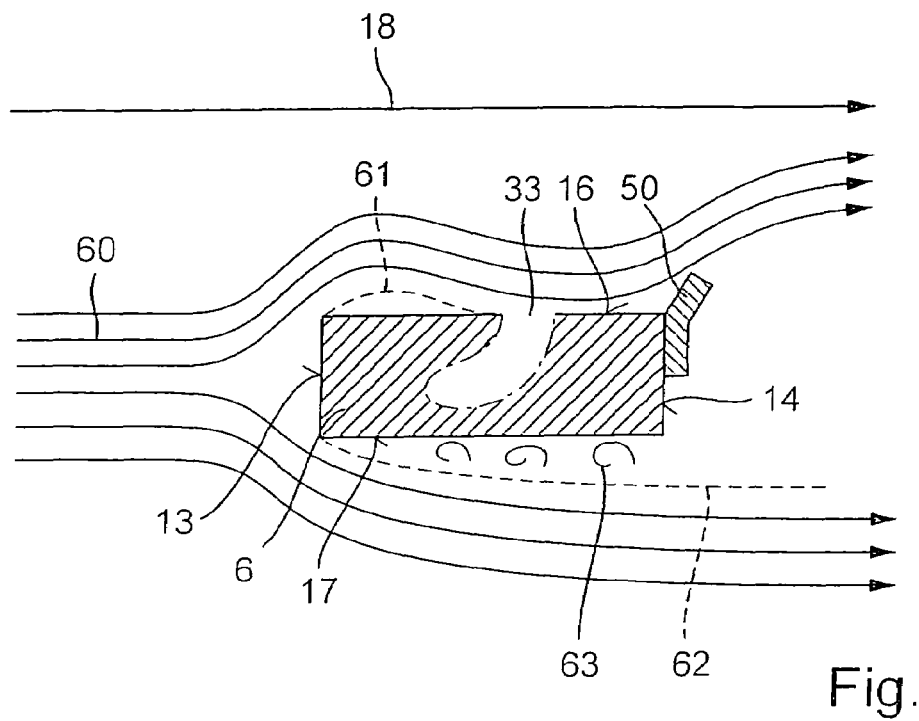
FIG. 2 shows a schematic view of a cross-section through the device according to the invention with the wind shield, and shows a representation of the flow conditions in the line.
Figure 4:
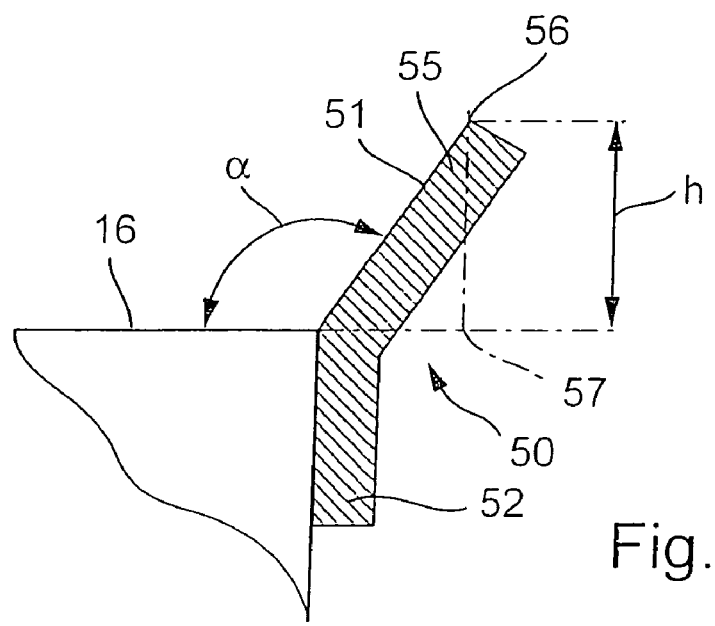
FIG. 4 shows an enlarged detail of FIG. 2.

FIG. 2 shows a schematic cross-section through part 6. Main direction of flow 18 and the local flow conditions of the medium in the vicinity of part 6 are illustrated. Flow lines 60 of the flow of medium near part 6 are shown. It will be seen in the cross-sectional view shown in FIG. 2 that part 6 has a wind shield 50 which is disposed downstream of the at least one separation aperture 33 in the direction of main direction of flow 18 and which projects from side wall 16 provided with the separation aperture. The wind shield is arranged on part 6 in such a manner that the plane of section shown in FIG. 2 intersects both the separation aperture and the wind shield. An enlarged detail is shown in FIG. 4. The wind shield, which is constructed as a wind deflecting plate, is in this embodiment fastened by an end portion 52 to rear wall 14 of part 6, which rear wall 14 faces away from the main flow. A second end portion 55 projects beyond side wall 16 into the flow. The distance h between end 56 of wind shield 50 projecting from side wall 16 and side wall 16 provided with separation aperture 33 is approximately from 0.5 to 5 millimeters. Distance h is defined by the shortest distance of projecting end 56 of wind shield 50 from perpendicular base point 57 of the distance line, shown dashed in FIG. 4, on a plane extending through side wall 16. End portion 55 projecting from side wall 16 into the flow has a flat surface 51 facing toward main direction of flow 18. Flat surface 51 forms with side wall 16 provided with separation aperture 33 an obtuse angle α that is greater than or equal to 90° and smaller than 160°. In FIG. 2 and FIG. 4 it is not possible to see the lengthwise dimension of wind shield 50. This is shown, however, in FIG. 6 for a second exemplary embodiment which is described hereinafter. In the case of the first exemplary embodiment shown in FIG. 2 and FIG. 4 also, wind shield 50 extends in a direction perpendicular to main direction of flow 18 and parallel to side wall 16, with a lengthwise dimension L that corresponds to a multiple of the diameter of separation aperture 33 and that preferably extends in that direction over approximately the entire length of part 6 provided with the channel structure. Wind shield 50 may, however, also be shorter.

The mode of operation of the wind shield will be described below. FIG. 2 shows the flow lines of the flow of medium in line 3 in the vicinity of part 6. It will be seen that the flow impinges on front wall 13 of part 6 and that detachment regions, represented by dashed lines 61 and 62, form at the edges formed by front wall 13 and the two side walls 16 and 17 that face away from each other. At side wall 17, which is not provided with wind shield 50, depending on the flow speed the flow (line 62) may become detached from the side wall to a very great extent and may not reattach. In the detachment regions, the flow is not stationary but pulsates and produces pressure variations, as is indicated in FIG. 2 by eddies 63. As will also be apparent, at other side wall 16, wind shield 50 causes an altered flow behavior. The modified, smaller dead water region is represented by dashed line 61. Owing to wind shield 50 at the downstream end of side wall 16, the flow is accelerated in the vicinity of side wall 16 and reattaches to the side wall in the region of separation aperture 33. Consequently, pressure variations in the detachment region are not transmitted through separation aperture 33 to the channel structure in the interior of part 6.

Figure 3A:
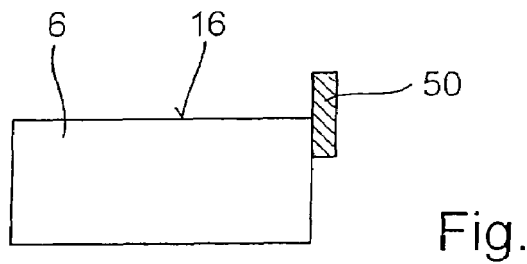
FIGS. 3a, 3b and 3c show further exemplary embodiments of the wind shield.
Figure 3B:
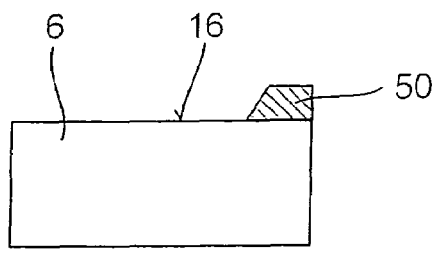
Figure 3C:
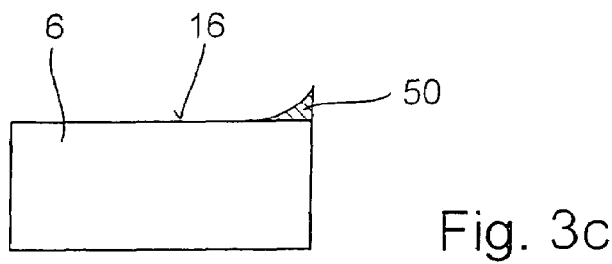

Various exemplary embodiments are possible for the wind shield. FIG. 3a shows an exemplary embodiment with a wind shield 50 projecting perpendicularly from side wall 16. FIG. 3b shows an exemplary embodiment in which the wind shield is formed by a projection on side wall 16, which projection is preferably formed integrally with part 6 and does not necessarily have to be arranged at the downstream end of side wall 16. FIG. 3c shows a wind shield having a curved surface, and therefore not a flat surface, facing toward the main direction of flow. Further embodiments of the wind shield are possible, of course, which are not illustrated here. What is important is that the wind shield projects from the side wall into the flow downstream of the separation aperture. In particular, in an exemplary embodiment in which two separation apertures are provided on the two side walls 16, 17 facing away from each other, it is also possible for two wind shields to project from the two side walls. If the separation aperture is disposed on lower side wall 19, the wind shield may also project from lower side wall 19 of part 6 downstream of the separation aperture.

Figure 5:
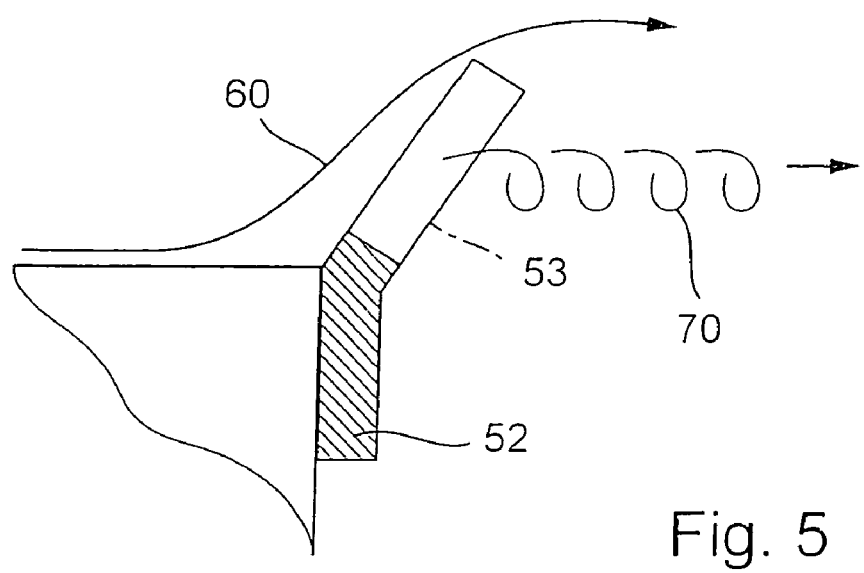
FIG. 5 shows an enlarged for a further exemplary embodiment.
Figure 6:
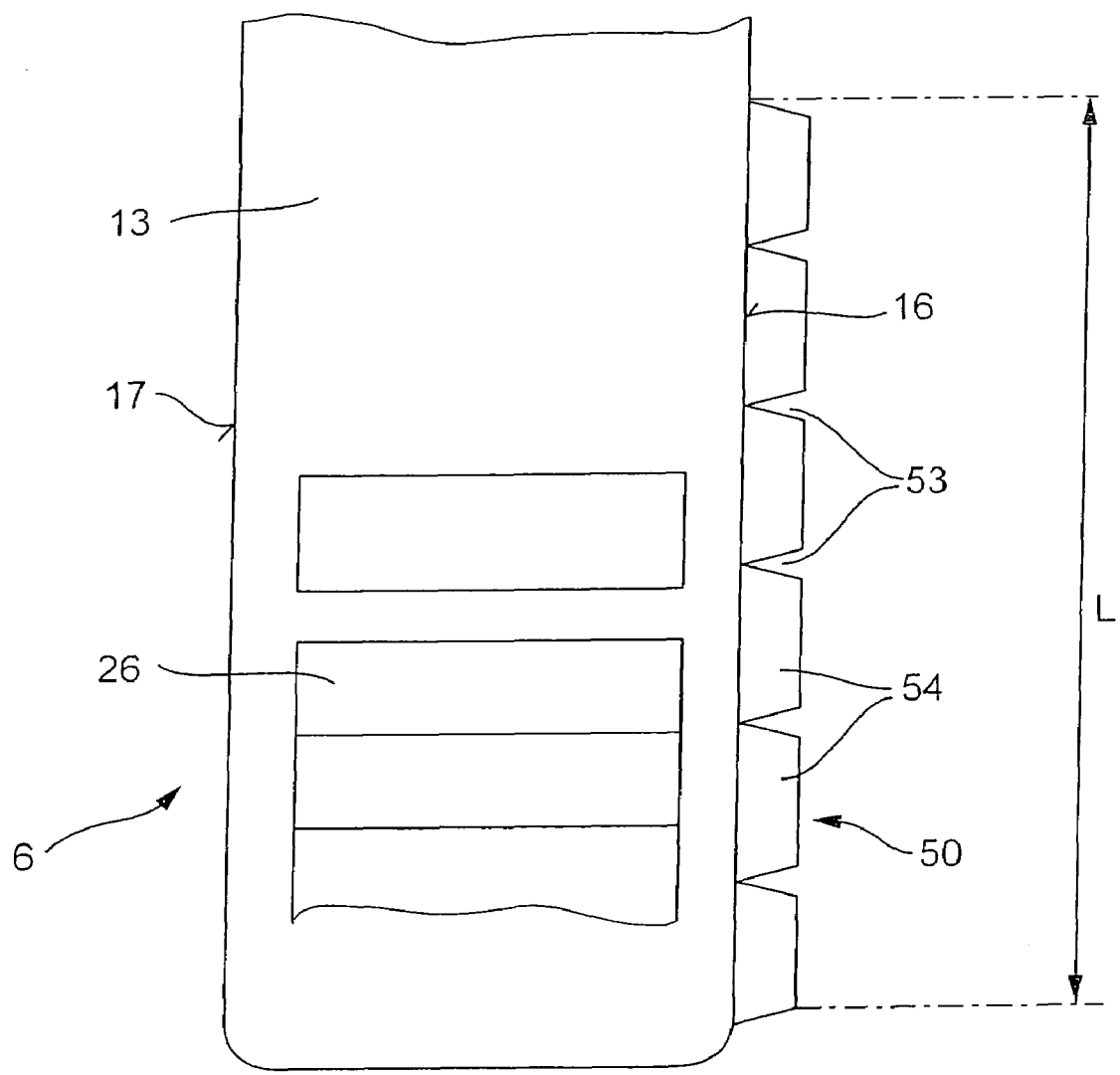
FIG. 6 shows a plan view of the front side of the device with a wind shield of the kind shown in FIG. 5.

An especially advantageous exemplary embodiment is illustrated in FIG. 5 and FIG. 6, which show a development of the wind shield illustrated in FIG. 2. The flow behind part 6 viewed in the downstream direction is diverted to a relatively great extent by the wind shield in FIG. 2, with the result that a large dead water region is produced behind part 6, in which the flow pulsates and there are pressure variations. Dead water region is to be understood as being the region of flow downstream of the line of detachment in the main direction of flow, in which region there is a turbulent form of flow in addition to a greatly decelerated basic flow.

In order to prevent pressure variations of the dead water region from quite possibly propagating as far as separation aperture 33, it is advantageous to provide the wind shield with openings 53, as shown in FIG. 6. Openings 53 may be made in wind shield 50 in the form of notches at regular or irregular intervals. The wind shield shown in FIG. 6 has a plurality of V-shaped notches, with the result that wind shield 50 is formed by a comb-like structure of teeth 54 arranged side by side in a row, the width of a tooth being greater than the space formed by notches 53 between two adjacent teeth. As illustrated in the enlarged detail shown in FIG. 5, starting at notches 53, strong longitudinal eddies 70 develop, the axes of which extend in main direction of flow 18. The longitudinal eddies bring about an exchange of momentum between the slow flow of medium in the dead water region and the rapid flow of medium outside the dead water region, thereby advantageously reducing the size of the dead water region and stabilizing the flow in that area. In that manner, transmission of pressure variations to the separation aperture is avoided even more reliably.

What is claimed is:

1. A device for determining at least one parameter of a medium flowing in a main direction of flow in a line, comprising:
   a part capable of insertion into the line with a predeterminable orientation in relation to the main direction of flow in such a manner that a partial stream of the medium flowing in the line passes into an entry region of a channel structure formed in the part; and
   a structure including a measuring channel and provided with a measuring element for determining the at least one parameter, the measuring channel branching off from the entry region, wherein:
     the entry region includes a separation zone that is separated from the measuring channel,
     the entry region includes at least one separation aperture that opens into the line at a side wall of the part,
     the side wall extends substantially parallel to the main direction of flow, and
     the part includes at least one wind shield disposed downstream of the at least one separation aperture in the main direction of flow and that projects from the side wall provided with the separation aperture.

2. The device as recited in claim 1, wherein:
   the at least one wind shield has, in a direction perpendicular to the main direction of flow and parallel to the side wall of the part, a lengthwise dimension L that corresponds to a multiple of a diameter of the at least one separation aperture and that extends in the direction perpendicular to the main direction over approximately an entire length of the part provided with the channel structure.

3. The device as recited in claim 2, wherein the at least one wind shield is provided with openings.

4. The device as recited in claim 3, wherein the openings are notches.

5. The device as recited in claim 2, wherein:
   the at least one wind shield has a comb-like structure of teeth arranged side by side in a row, and
   a width of a tooth is greater than a distance between two adjacent teeth.

6. The device as recited in claim 1, wherein the at least one wind shield has a flat surface facing toward the main direction of flow.

7. The device as recited in claim 6, wherein the flat surface forms with the side wall an angle ($\alpha$) that is at least 90° and smaller than 160°.

8. The device as recited in claim 1, wherein a distance between an end of the at least one wind shield projecting from the side wall and the side wall is approximately from 0.5 to 5 millimeters.

9. The device as recited in claim 1, wherein:
   the at least one wind shield is disposed at a downstream end of the side wall viewed in the main direction of flow.

10. The device as recited in claim 1, wherein the device is for determining an air mass flow in an intake system of an internal combustion engine.

* * * * *